United States Patent
Kim

(10) Patent No.: US 11,023,066 B2
(45) Date of Patent: Jun. 1, 2021

(54) DISPLAY DEVICE INCLUDING TOUCH SENSOR AND DRIVING METHOD THEREOF

(71) Applicant: Samsung Display Co., Ltd., Yongin-si (KR)

(72) Inventor: Ji Woong Kim, Yongin-si (KR)

(73) Assignee: SAMSUNG DISPLAY CO., LTD.

( * ) Notice: Subject to any disclaimer, the term of this patent is extended or adjusted under 35 U.S.C. 154(b) by 0 days.

(21) Appl. No.: 16/198,661

(22) Filed: Nov. 21, 2018

(65) Prior Publication Data
US 2019/0163313 A1 May 30, 2019

(30) Foreign Application Priority Data
Nov. 24, 2017 (KR) .......................... 10-2017-0158639

(51) Int. Cl.
| | |
|---|---|
| G06F 3/044 | (2006.01) |
| G06F 3/042 | (2006.01) |
| G09G 3/3233 | (2016.01) |
| G06F 3/041 | (2006.01) |

(52) U.S. Cl.
CPC ............ G06F 3/0416 (2013.01); G06F 3/042 (2013.01); G06F 3/044 (2013.01); G06F 3/0412 (2013.01); G06F 3/0445 (2019.05); G06F 3/0446 (2019.05); G06F 3/04164 (2019.05); G06F 3/04186 (2019.05); *G06F 2203/04104* (2013.01); *G06F 2203/04106* (2013.01); *G09G 3/3233* (2013.01); *G09G 2354/00* (2013.01); *G09G 2360/145* (2013.01)

(58) Field of Classification Search
CPC combination set(s) only.
See application file for complete search history.

(56) References Cited

U.S. PATENT DOCUMENTS

| | | |
|---|---|---|
| 9,069,420 B2 | 6/2015 | Liu |
| 9,645,675 B2 | 5/2017 | Ye |
| 9,733,761 B2 | 8/2017 | Ku et al. |
| 2008/0158172 A1* | 7/2008 | Hotelling ................. G06F 3/041 345/173 |
| 2011/0018840 A1* | 1/2011 | Fann ....................... G06F 3/0412 345/174 |

(Continued)

FOREIGN PATENT DOCUMENTS

| | | |
|---|---|---|
| KR | 10-1466531 | 12/2014 |
| KR | 10-2016-0084941 | 7/2016 |
| KR | 10-2017-0088989 | 8/2017 |

*Primary Examiner* — Nitin Patel
*Assistant Examiner* — Amen W. Bogale
(74) *Attorney, Agent, or Firm* — H.C. Park & Associates, PLC

(57) ABSTRACT

A display device may include: a first touch sensor including first sensing electrodes and second sensing electrodes, arranged in a sensing area intersecting each other; a display panel including: pixels arranged in a display area overlapping with the sensing area; and a second touch sensor including photo sensors disposed between the pixels or in the pixels; and a driving circuit configured to drive the first touch sensor and the display panel, wherein the driving circuit may be configured to detect a touch input by comparing a first touch detection value detected by the first touch sensor and a second touch detection value detected by the photo sensors.

18 Claims, 11 Drawing Sheets

(56) References Cited

U.S. PATENT DOCUMENTS

| | | | |
|---|---|---|---|
| 2011/0069038 A1* | 3/2011 | Fann | G06F 3/0386 |
| | | | 345/175 |
| 2011/0080358 A1* | 4/2011 | Park | G06F 3/0412 |
| | | | 345/173 |
| 2014/0085246 A1* | 3/2014 | Shahparnia | G06F 3/0443 |
| | | | 345/174 |
| 2014/0192018 A1* | 7/2014 | Kurasawa | G06F 3/0446 |
| | | | 345/174 |
| 2014/0213323 A1* | 7/2014 | Holenarsipur | G06F 3/0304 |
| | | | 455/566 |

* cited by examiner

DISPLAY DEVICE INCLUDING TOUCH SENSOR AND DRIVING METHOD THEREOF

CROSS-REFERENCE TO RELATED APPLICATION

This application claims priority from and the benefit of Korean Patent Application No. 10-2017-0158639, filed on Nov. 24, 2017, which is hereby incorporated by reference for all purposes as if fully set forth herein.

BACKGROUND

Field

Exemplary embodiments of the invention relate generally to a display device and a driving method thereof, and more specifically, to a display device including a touch sensor and a driving method thereof.

Discussion of the Background

A touch sensor is provided in a display device, etc. to detect a touch input of a user. For example, the touch sensor may be attached to a surface of a display panel or be integrally manufactured with the display panel, to detect a touch input provided to the display device. The user may input information or control the display device by pressing or touching the touch sensor while viewing an image displayed on a screen of the display device.

The above information disclosed in this Background section is only for understanding of the background of the inventive concepts, and, therefore, it may contain information that does not constitute prior art.

SUMMARY

Devices constructed according to exemplary embodiments of the invention provide a display device including a high-sensitivity touch sensor and a driving method thereof.

According to one or more exemplary embodiments of the invention, a display device may include: a first touch sensor including first sensing electrodes and second sensing electrodes, arranged in a sensing area intersecting each other; a display panel including: pixels arranged in a display area overlapping with the sensing area; and a second touch sensor including photo sensors disposed between the pixels or in the pixels; and a driving circuit configured to drive the first touch sensor and the display panel, wherein the driving circuit may be configured to detect a touch input by comparing a first touch detection value detected by the first touch sensor and a second touch detection value detected by the photo sensors.

The driving circuit may be configured to detect the touch input by performing an AND operation of the first touch detection value and the second touch detection value.

The photo sensors may be disposed between light emitting areas of the pixels.

Each of the pixels may include a pixel circuit including at least one transistor and a light emitting device connected to the pixel circuit, wherein each of the photo sensors may include a sensor transistor disposed on the same layer as the transistor.

Each of the pixels may include a pixel circuit including at least one transistor and a light emitting device connected to the pixel circuit, and wherein each of the photo sensors may be implemented with at least one transistor included in any one pixel among the pixels.

The display device further including a black matrix disposed on at least an area between the pixels, the black matrix including an opening corresponding to each of the photo sensors.

The first touch sensor is a self-capacitance type touch sensor.

The driving circuit includes: a driving signal supplier configured to supply a driving signal to each of the first sensing electrodes and the second sensing electrodes during a touch sensing period; a first sensing circuit configured to receive a sensing signal corresponding to the driving signal from each of the first sensing electrodes and the second sensing electrodes during the touch sensing period, and generate the first touch detection value, corresponding to the sensing signal; a second sensing circuit configured to detect an amount of current flowing through each of the photo sensors during the touch sensing period, and generate the second touch detection value, corresponding to the amount of current; and a processor configured to detect the touch input by comparing the first touch detection value and the second touch detection value.

The first sensing circuit may be configured to: compare the sensing signal output from each of the first sensing electrodes and the second sensing electrodes with a predetermined reference value; and generate the first touch detection value in the form of a digital code, corresponding to the compared result.

The second sensing circuit may be configured to: compare an amount of current output from each of the photo sensors or a variation in the amount of current with a predetermined reference amount of current; and generate the second touch detection value in the form of a digital code, corresponding to the compared result.

The second sensing circuit may be configured to generate the second touch detection value by detecting the position of a photo sensor from which a current of which amount is the reference amount of current or less is output among the photo sensors.

The photo sensors may be distributed in the display area with a resolution equal to or lower than that of the pixels and the first touch sensor.

According to one or more exemplary embodiments of the invention, a method for driving a display device including a first touch sensor including first and second sensing electrodes arranged in a sensing area to intersect each other and a second touch sensor including photo sensors arranged together with pixels in a display area overlapping with the sensing area, the method may include: acquiring a first touch detection value, in response to a first sensing signal received from the first touch sensor while driving the first touch sensor; acquiring a second touch detection value, in response to a second sensing signal received from the photo sensors during a period in which the first touch sensor is driven; and detecting a touch input by comparing the first touch detection value and the second touch detection value.

Each of the first touch detection value and the second touch detection value may be generated in the form of a digital code.

The detecting of the touch input may include generating a touch detection signal by performing an AND operation of the first touch detection value and the second touch detection value.

The acquiring of the first touch detection value may include: supplying a driving signal to each of the first and second sensing electrodes; receiving the first sensing signal from each of the first and second sensing electrodes; and generating the first touch detection value, corresponding to the received first sensing signal.

The generating of the first touch detection value may include: comparing the first sensing signal with a predetermined reference value; and outputting the first touch detection value in the form of a digital code, in response to the compared result.

The acquiring of the second touch detection value may include: detecting an amount of current flowing through each of the photo sensors or a variation in the amount of current; comparing the amount of current flowing through each of the photo sensors or the variation in the amount of current with a predetermined reference amount of current; and generating the second touch detection value, corresponding to the compared result.

The generating of the second touch detection value may include: comparing an amount of current flowing through each of the photo sensors or a variation in the amount of current with a predetermined reference amount of current; and outputting the second touch detection value in the form of a digital code, in response to the compared result.

The method may further include determining whether a single or multi-touch has occurred, based on at least one of the first sensing signal and the second sensing signal, wherein the first touch detection value may be transmitted in response to determining that the single touch occurred, and wherein the touch input may be detected using the first touch detection value and the second touch detection value in response to determining that the multi-touch occurred.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
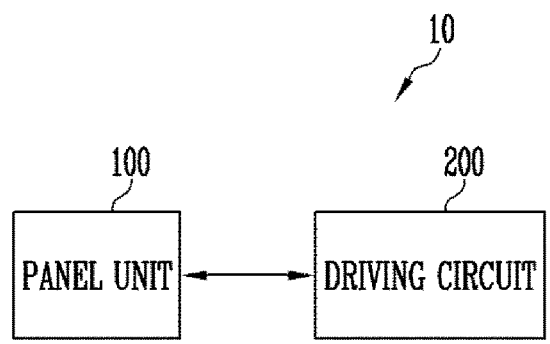
FIG. 1 is a block diagram of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram of a display device 10 according to an exemplary embodiment.

Referring to FIG. 1, the display device 10 according to the exemplary embodiment includes a panel unit 100 for implementing a screen and a driving circuit 200 for driving the panel unit 100.

The panel unit 100 includes pixels and displays an image, using the pixels. Also, the panel unit 100 includes a touch sensor for detecting a touch input. For example, in an exemplary embodiment, the panel unit 100 may include a hybrid type touch sensor configured with a first touch sensor and a second touch sensor, which are of different types. Accordingly, when a touch input of a user occurs, the panel unit 100 can transmit a sensing signal corresponding to the touch input.

The driving circuit 200 generates various driving signals for driving the panel unit 100, and supplies or transmits the generated driving signals to the panel unit 100. The driving circuit 200 may generate scan and data signals corresponding to image data and various control signals received from a host, etc., and supply the generated scan and data signals to the pixels of the panel unit 100. Also, when the panel unit 100 includes at least one touch sensor, the driving circuit 200 supplies a driving signal to the touch sensor, and receives a sensing signal transmitted from the touch sensor, corresponding to the driving signal, thereby detecting a touch input.

Referring to FIG. 1, the panel unit 100 and the driving circuit 200 are components separated from each other, but the exemplary embodiments are not limited thereto. In exemplary embodiments, a portion of the driving circuit 200 may be integrally manufactured with the panel unit 100. For example, a scan driver for generating a scan signal may be formed together with the pixels in the panel unit 100.

Figure 2:
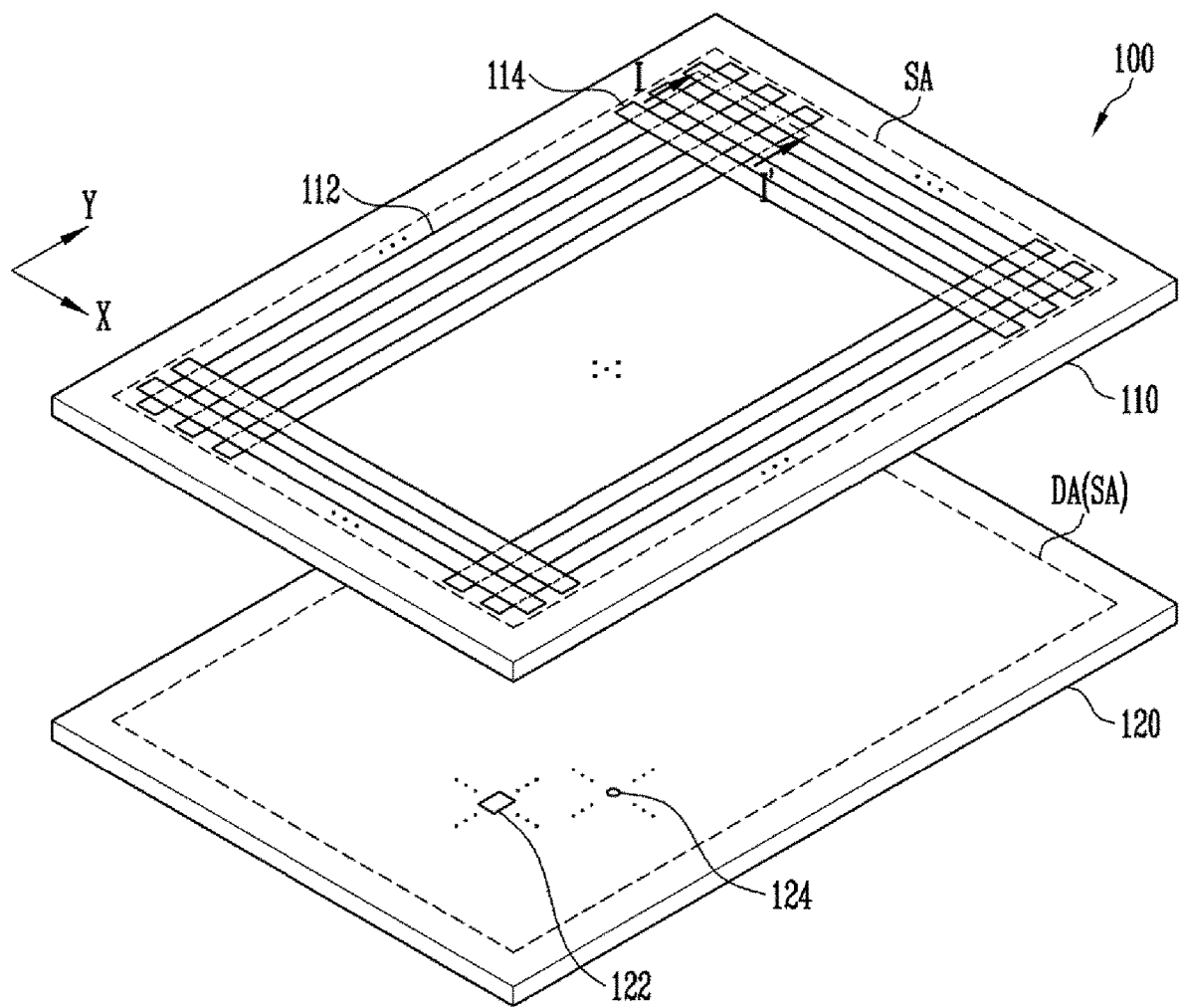
FIG. 2 is a perspective view of a panel unit according to an exemplary embodiment.
Figure 3:
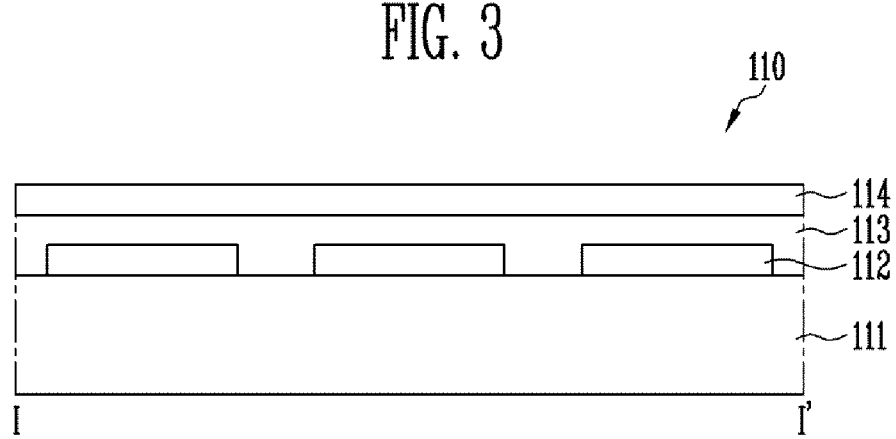
FIG. 3 is an exemplary section diagram taken along a sectional line I-I' of FIG. 2.

FIG. 2 is a perspective view of a panel unit according to an exemplary embodiment. In FIG. 2, an example of the panel unit shown in FIG. 1 is illustrated. FIG. 3 is an exemplary section diagram taken along a sectional line I-I' of FIG. 2.

Referring to FIG. 2, the panel unit 100 according to the exemplary embodiment includes a first touch sensor 110 and a display panel 120. Meanwhile, in FIG. 2, it is illustrated that the first touch sensor 110 and the display panel 120 are components separated from each other, but the exemplary embodiments are not limited thereto. For example, after the first touch sensor 110 is manufactured separately from the display panel 120, the first touch sensor 110 may be disposed on one surface of the display panel 120. For example, the first touch sensor 110 may be integrally manufactured with the display panel 120. For example, the first touch sensor 110 may be attached onto an upper surface (image display surface) of the display panel 120, or be integrally configured with the display panel 120 by using, as a base substrate, a pixel substrate, an encapsulation substrate (or thin film encapsulation layer), or a polarization layer, which is included in the display panel 120.

The first touch sensor 110 includes a sensing area SA capable of sensing a touch input, and first sensing electrodes 112 and second sensing electrodes 114, which are arranged in the sensing area SA. In exemplary embodiments, the first sensing electrodes 112 and the second sensing electrodes 114 may extend along different directions to intersect each other in the sensing area SA.

For example, the first sensing electrodes 112 may extend along a Y direction in the sensing area SA to be spaced apart from each other in an X direction. Predetermined X coordinate values may be provided to each of the first sensing electrodes 112.

In addition, the second sensing electrodes 114 may extend along the X direction in the sensing area SA to be spaced apart from each other in the Y direction. Predetermined Y coordinate values may be provided to each of the second sensing electrodes 114.

Referring to FIG. 2, each of the first sensing electrodes 112 and the second sensing electrodes 114 is a bar-shaped electrode. However, the shape and/or structure of the first sensing electrodes 112 and the second sensing electrodes 114 according to the exemplary embodiments are not limited there to and may be variously changed. For example, according to another exemplary embodiment, each of the first sensing electrodes 112 and the second sensing electrodes 114 may be implemented in another shape. According to an exemplary embodiment, each of the first sensing electrodes 112 and the second sensing electrodes 114 may be configured with a plurality of electrode cells and a plurality of connection parts for connecting the electrode cells.

At least one insulating layer (or space) is disposed between the first sensing electrodes 112 and the second sensing electrodes 114. Referring to FIG. 3, the first touch sensor 110 includes a sensor substrate 111, and the first sensing electrodes 112 and the second sensing electrodes 114, which are disposed on one surface of the sensor substrate 111, and at least one insulating layer 113 may be interposed between the first sensing electrodes 112 and the second sensing electrodes 114. Accordingly, the first sensing electrodes 112 and the second sensing electrodes 114 may be insulated from each other.

In exemplary embodiments, the first touch sensor 110 may be disposed on a front surface (e.g., an image display surface) of the display panel 120. In this case, the first touch sensor 110 may be formed substantially transparent. Accordingly, the sensor substrate 111, the first and second sensing electrodes 112 and 114, and the insulating layer 113 may be formed substantially transparent. For example, the sensor substrate 111 may be formed of a transparent or translucent material that satisfies or meets a predetermined transparency condition. In exemplary embodiments, the sensor substrate 111 may be a thin film substrate made of a glass or plastic material, and the material or thickness of the sensor substrate 111 according to the exemplary embodiments are not particularly limited. For example, the sensor substrate 111 may be implemented with substrates made of various materials, including a transparent thin film substrate made of a plastic material such as PET, a transparent or colored PI substrate, a glass substrate, and the like.

Also, the sensor substrate 111 may be provided separately from the display panel 120, or be implemented with at least one substrate and/or insulating layer constituting the display panel 120. For example, the sensor substrate 111 may be a separate sensor substrate separated from the display panel 120, or be integrally configured with an upper substrate or thin film encapsulation layer of the display panel 120.

In exemplary embodiments, the first and second sensing electrodes 112 and 114 may be formed substantially transparent. For example, the first and second sensing electrodes 112 and 114 may be formed of a transparent or translucent material that satisfies or meets a predetermined transparency condition, or be formed in a structure that satisfies or meets the transparency condition.

The first and second sensing electrodes 112 and 114 may include at least one of a metallic material, a transparent conductive material, and various other conductive materials to have conductivity. Also, when the first and second sensing electrodes 112 and 114 include an opaque material, the thickness of the first and second sensing electrodes 112 and 114 is limited, or the first and second sensing electrodes 112 and 114 are configured in a mesh form, thereby providing transparency. In addition, each of the first and second sensing electrodes 112 and 114 may be provided in a single layer or a multi-layer. For example, each of the first and second sensing electrodes 112 and 114 may be provided in a double layer including a plate-shaped electrode made of a transparent conductive material and a mesh-shaped metal electrode overlapping with the plate-shaped electrode. That is, in the exemplary embodiments, the material, thickness, and structure of the first and second sensing electrodes 112 and 114 of the exemplary embodiments are not particularly limited.

The metallic material constituting the first and second sensing electrodes 112 and 114 may include at least one of various metallic materials such as gold (Au), silver (Ag), aluminum (Al), molybdenum (Mo), chromium (Cr), titanium (Ti), nickel (Ni), neodymium (Nd), copper (Cu), and platinum (Pt), or alloys thereof, but the exemplary embodiments are not limited thereto. Also, the transparent conductive material constituting the first and second sensing electrodes 112 and 114 may include at least one of silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like, but the exemplary embodiments are not limited thereto. In addition, the first and second sensing electrodes 112 and 114 may include various conductive materials.

Each of the first and second sensing electrodes 112 and 114 forms a capacitance with an adjacent conductor (e.g., an adjacent sensing electrode 112 or 114). In response to a finger of a user (or another conductive contact means) being in contact with each of the first and second sensing electrodes 112 and 114 in a corresponding area or the finger approaching each of the first and second sensing electrodes 112 and 114 within an effective distance, each of the first and second sensing electrodes 112 and 114 may form a capacitance with the finger. Thus, when the finger is in contact with or is approaching each of the first and second sensing electrodes 112 and 114, the quantity of charges stored in each of the first and second sensing electrodes 112 and 114 is changed. Accordingly, a change in capacitance formed in each of the first and second sensing electrodes 112 and 114 is detected, so that a touch input of the user can be detected.

The display panel 120 includes a plurality of pixels 122 and a plurality of photo sensors 124, which are arranged in a display area DA. In exemplary embodiments, the display area may overlap with the sensing area SA of the first touch sensor 110. For example, when viewed from the top of the panel unit 100, the display area DA and the sensing area SA may correspond to each other. However, the exemplary embodiments are not limited thereto. For example, according to another exemplary embodiment, only a partial area of the display area DA may be set as the sensing area SA.

The pixels 122 may be, for example, pixel of an organic light emitting display device. However, according to the exemplary embodiments, the kind or driving method of the pixels 122 is not particularly limited. That is, the display panel 120 may be implemented with display panels having various structures and/or driving methods currently known in the art.

The photo sensors 124 may be disposed between the pixels 122 or in at least some of the pixels 122. For example, the photo sensors 124 may be disposed between light emitting areas of adjacent pixels 122 or be disposed in pixel circuits of at least some pixels 122. The photo sensors 124 may be implemented as photo sensing devices for transmitting current corresponding to the amount of light received thereto, to constitute a second touch sensor. For example, the photo sensors 124 may be configured with a transistor of which current characteristic is changed (e.g., shifted) corresponding to the amount of light received thereto, a photo diode, etc. The photo sensors 124 are dispersed in the display area DA to constitute the second touch sensor.

Specifically, if a finger of a user is in contact with or approaches the display area DA (and/or the sensing area SA), the amount of light received to at least one photo sensor 124 located in the corresponding area is decreased. Accordingly, the magnitude of current flowing through the photo sensor 124 is decreased. Thus, a touch input can be detected by monitoring a current output from each of the photo sensors 124. For example, if the magnitude of current output from at least one photo sensor 124 is decreased to a predetermined reference current value or less, it may be determined that a touch input has occurred at a position (coordinate on the display area DA) corresponding to the photo sensor 124.

As described above, the display device 10 according to the exemplary embodiment includes a hybrid type touch sensor including a self-capacitance type first touch sensor 110 and a light-sensing type second touch sensor. The display device 10 according to the exemplary embodiment may detect a touch input, using a first touch detection value of the first touch sensor 110 and a second touch detection value of the sensor touch sensor. Accordingly, misrecognition caused by a multi-touch can be prevented or reduced, and the sensitivity of the touch sensor can be improved.

Figure 4:
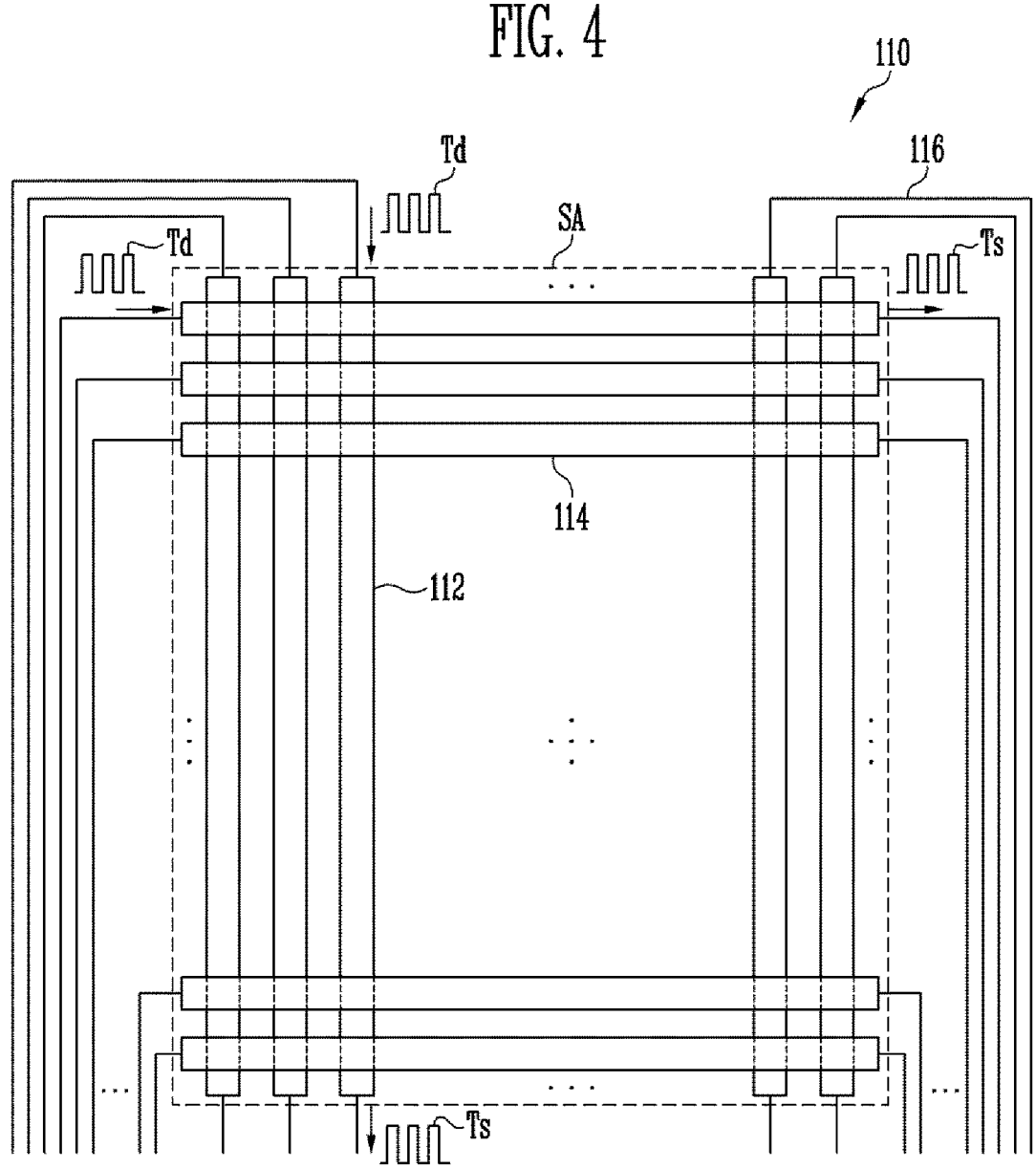
FIG. 4 is an exemplary configuration of a first touch sensor according to an exemplary embodiment.
Figure 5:
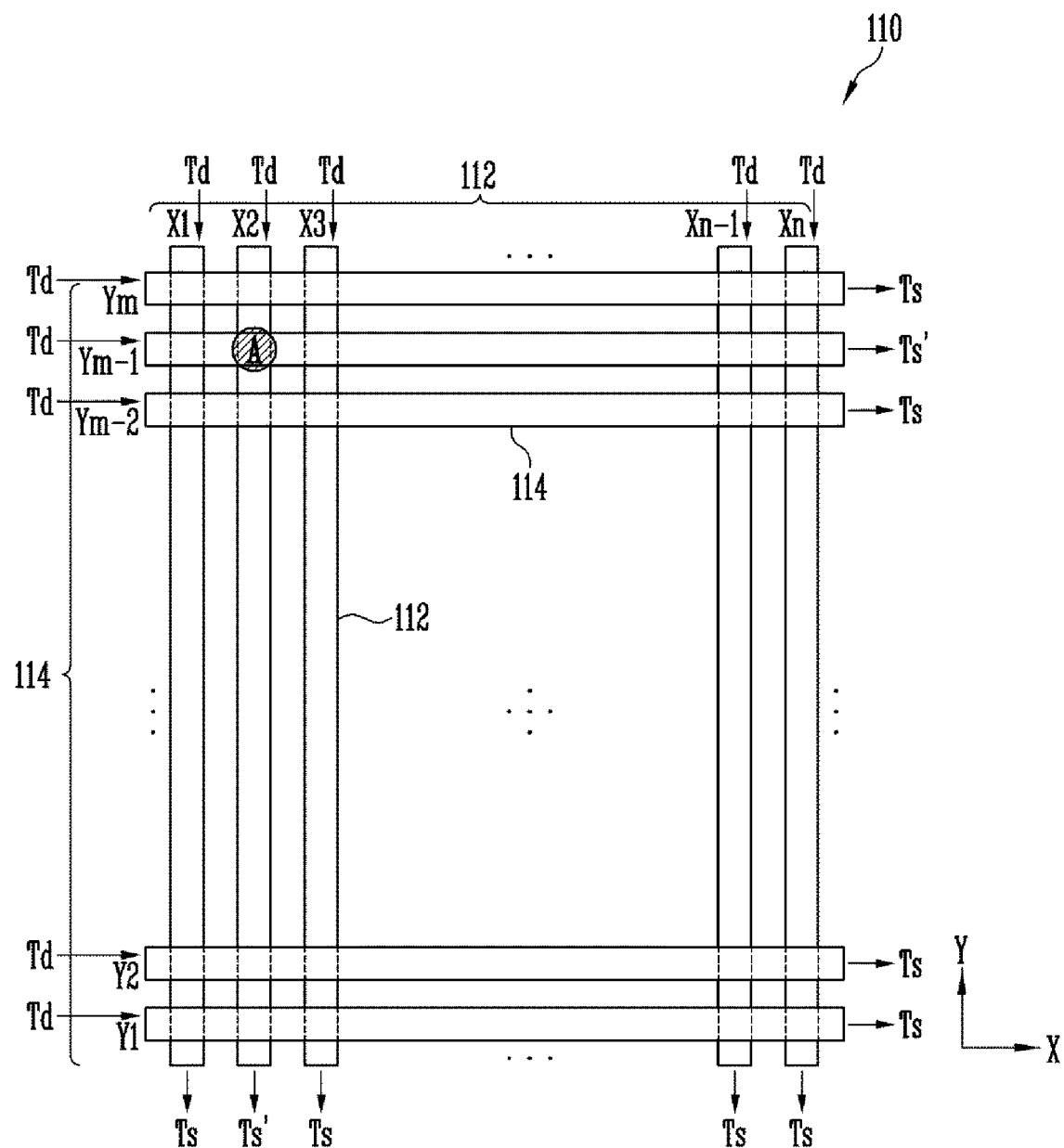
FIG. 5 illustrates an exemplary method of performing a single touch detection of the first touch sensor shown in FIG. 4.
Figure 6:
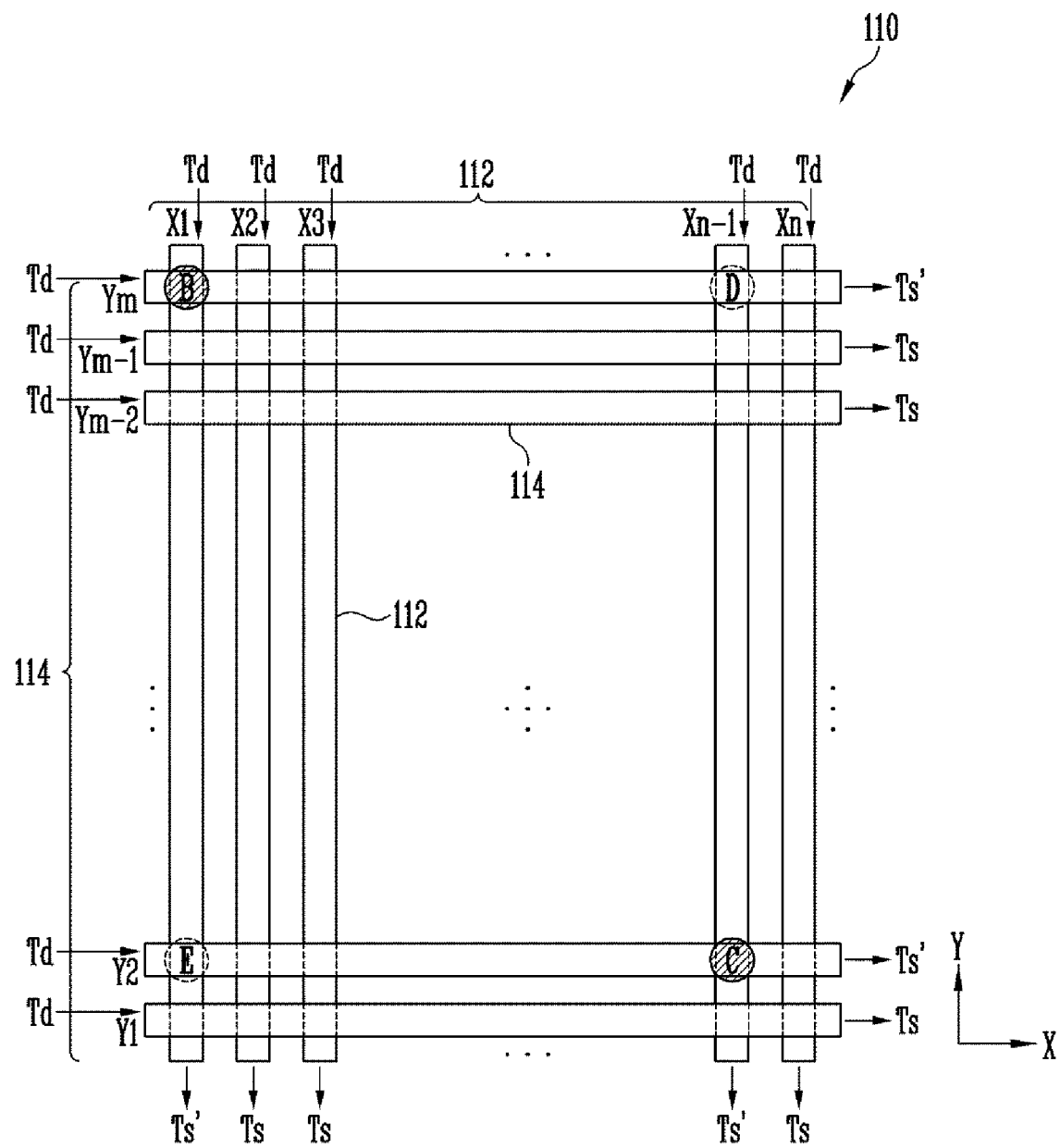
FIG. 6 illustrates an exemplary method of performing a multi-touch detection of the first touch sensor shown in FIG. 4.

FIG. 4 is an exemplary configuration of the first touch sensor according to an exemplary embodiment. FIG. 5 illustrates an exemplary method of performing a single touch detection of the first touch sensor shown in FIG. 4. FIG. 6 illustrates an exemplary method of performing a multi-touch detection of the first touch sensor shown in FIG. 4. In FIGS. 4, 5, and 6, components similar to identical to those of FIG. 2 are designated by like reference numerals, and their detailed descriptions will be omitted.

Referring to FIG. 4, during a touch sensing period in which a touch sensing mode is activated, each of the first sensing electrodes 112 and the second sensing electrodes 114 receives a driving signal Td and transmits a first sensing signal Ts corresponding to the driving signal Td. For example, each of the first sensing electrodes 112 and the second sensing electrodes 114 may transmit the first sensing signal Ts corresponding to the driving signal Td while receiving the driving signal Td.

Lines 116 may be connected to both ends of the first sensing electrodes 112 and the second sensing electrodes 114, respectively. In this case, two lines 116 may be connected to respective ends of each of the first sensing electrodes 112 and the second sensing electrodes 114, and each of the first sensing electrodes 112 and the second sensing electrodes 114 may receive the driving signal Td through a line 116 connected to one end thereof and transmit the first sensing signal Ts through a line 116 connected to the other end thereof. In exemplary embodiments, the driving signal Td may be supplied by the driving circuit 200, and the first sensing signal Ts may be input to the driving circuit 200.

According to another embodiment, only one line 116 may be connected to each of the first sensing electrodes 112 and the second sensing electrodes 114. In this case, the period in which the driving signal TD is applied through each of the lines 116 and the period in which the first sensing signal Ts is transmitted through each of the lines 116 may be separated from each other by time-sharing signal transmission, thereby driving the first touch sensor 110.

When a touch input is provided to one area of the first touch sensor 110, the quantity of charges stored in at least one first sensing electrode 112 and at least one second sensing electrode 114 disposed in the corresponding area is changed. Thus, a first sensing signal Ts transmitted from the first sensing electrode 112 and the second sensing electrode 114 in the area to which the touch input is provided is changed with a form and/or magnitude different from that of a first sensing signal Ts transmitted from the other first and second sensing electrodes 112 and 114. Accordingly, the touch input can be detected by comparing first sensing signals Ts respectively transmitted from the first sensing electrodes 112 and the second sensing electrodes 114 with each other, or by comparing each first sensing signal with a predetermined reference value.

For example, when a single touch input occurs at point A in the first touch sensor 110 as shown in FIG. 5, the same driving signal Td is supplied to the first sensing electrodes 112 and the second sensing electrodes 114, first sensing signals Ts' transmitted from a first sensing electrode X2 and a second sensing electrode Ym−1 at the point A has a wave form and/or magnitude different from that of a first sensing signal Ts transmitted from the other first and second sensing electrodes X1, X3 to Xn, Y1 to Ym−2, and Ym. Thus, the occurrence of the touch input and the position of the touch input can be detected using the first sensing signals Ts and Ts' transmitted from the first sensing electrodes 112 and the second sensing electrodes 114. For example, the coordinate of an intersection point of the first sensing electrode X2 and the second sensing electrode Ym−1, at which it is determined that the touch input has occurred (i.e., the coordinate of the point A), may be detected as the position at which the touch input has occurred.

The touch sensor 110 is implemented as a self-capacitance type touch sensor, and highly sensitively reacts with a touch input. Also, when a finger or another conductive contact means approaches the touch sensor 110 within an effective distance to a degree where a change in quantity of charges stored in at least one first sensing electrode 112 and/or at least one second sensing electrode 114 is caused, the touch sensor 110 highly sensitively reacts with such a touch input, so that hovering can be sensed.

The touch sensor 110 according to the exemplary embodiment is implemented as a cross self-capacitance type touch sensor including the first and second sensing electrodes 112 and 114 extending in the X direction and Y direction to intersect each other. In this case, although the same resolution (or density) is implemented, the number of lines 116 can be remarkably decreased compared with touch sensor including dotted sensing electrodes individually separated for every coordinate point. For example, a dotted self-capacitance type touch sensor includes a plurality of lines extracted in the sensing area SA to each of the dotted sensing electrodes. However, in the cross self-capacitance type first touch sensor 110, the lines 116 may be extracted at only the outside of the sensing area SA. Thus, in the cross self-capacitance type touch sensor, the first and second sensing electrodes 112 and 114 can be more densely arranged in the sensing area SA, compared with the dotted self-capacitance type touch sensor.

However, when the first touch sensor 110 is implemented as the cross self-capacitance type touch sensor, a ghost phenomenon may occur with respect to a multi-touch input. For example, referring to FIG. 6, when touch inputs respectively occur at points B and C, it may be recognized that touch inputs have occurred at all intersection points of first and second sensing electrodes X1, Xn−1, Y2, and Ym corresponding to the points B and C. That is, in addition to the points B and C at which the touch inputs have actually occurred, points D and E may also be misrecognized as areas at which the touch inputs have occurred, and it may be difficult to accurately detect a multi-touch input.

Accordingly, in the exemplary embodiment, a touch input is detected using the cross self-capacitance type first touch sensor 110 that exhibits high-sensitivity characteristics, and the ghost phenomenon is removed or reduced using the second touch sensor configured with the photo sensors 124 provided in the display panel 120. Thus, misrecognition caused by a multi-touch due to the ghost phenomenon can be prevented or reduced. According to the exemplary embodiment, the touch sensor may perform multi-touch recognition while exhibiting high-sensitivity characteristics. The configuration of a display device for removing a ghost phenomenon and a driving method of the display device will be described in more detail later.

Figure 7:
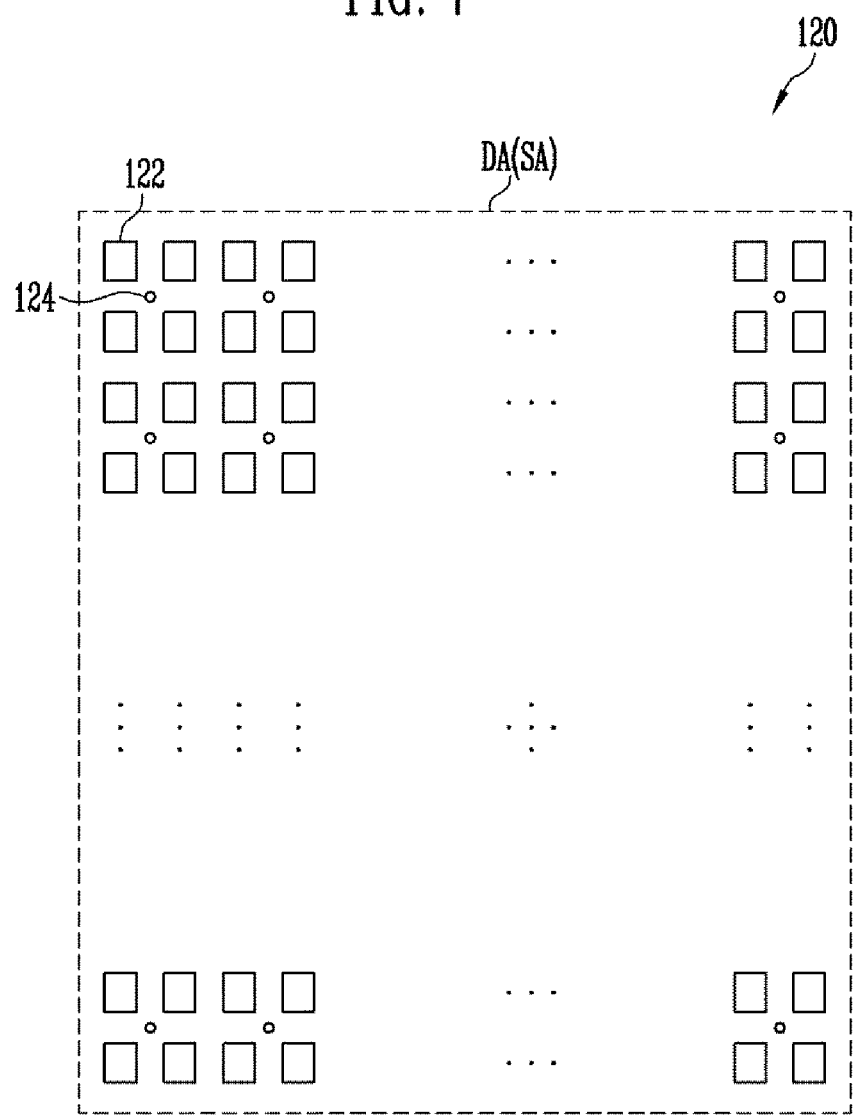
FIG. 7 is an example of a display panel shown in FIG. 2.

FIG. 7 is an example of the display panel shown in FIG. 2. In particular, FIG. 7 illustrates an embodiment related to the arrangement of the pixels and the photo sensors.

Referring to FIG. 7, the pixels 122 may be regularly or periodically distributed in the display area DA (or the sensing area SA), and the photo sensors 124 may be disposed between the pixels 122. For example, the photo sensors 124 may be disposed in a black matrix area between the pixels 122 (e.g., between the light emitting areas of the pixels 122). In this case, the black matrix area is partially opened in areas corresponding to the respective photo sensors 124, so that the incident external light can be detected by the photo sensors 124.

In exemplary embodiments, the photo sensors 124 may be distributed in the display area DA with a resolution (or density) higher that a resolution of a touch input from a finger or another contact means can be effectively detected and recognized. Also, the photo sensors 124 may be regularly or irregularly distributed in the display area DA. Each of the photo sensors 124 may be provided with a coordinate value corresponding to the position thereof.

In exemplary embodiments, the photo sensors 124 may be arranged to a degree where the occurrence of a touch input and the position of the touch input can be schematically detected. For example, the photo sensors 124 may be distributed in the display area DA with a resolution lower than that (or density) of the pixels 122. As an example, one photo sensor 124 may be disposed with respect to four pixels 122.

Also, in exemplary embodiments, the photo sensors 124 may be distributed in the display area with a resolution lower than that of the first touch sensor 110. For example, the photo sensors 124 may be respectively disposed at coordinate points defined by the first touch sensor 110. The photo sensors 124 may also be respectively disposed in unit areas each including a plurality of coordinate points defined by the first touch sensor 110. For example, a plurality of photo sensors 124 may be distributed in the display area DA in such a manner that one photo sensor 124 is disposed per touch area (e.g., about $4\pi$ mm$^2$) corresponding to an individual touch input from a finger, etc.

The photo sensors 124 generate a current corresponding to the amount of light incident from the outside during a period in which the first touch sensor 110 is driven. Then, the driving circuit 200 detects a touch input by detecting an amount of current flowing through each of the photo sensors 124 or a variation in the amount of current. Specifically, the driving circuit 200 detects a touch input by combining and considering a first touch detection value detected by the first touch sensor 110 and a second touch detection value detected by the second touch sensor.

Figure 8:
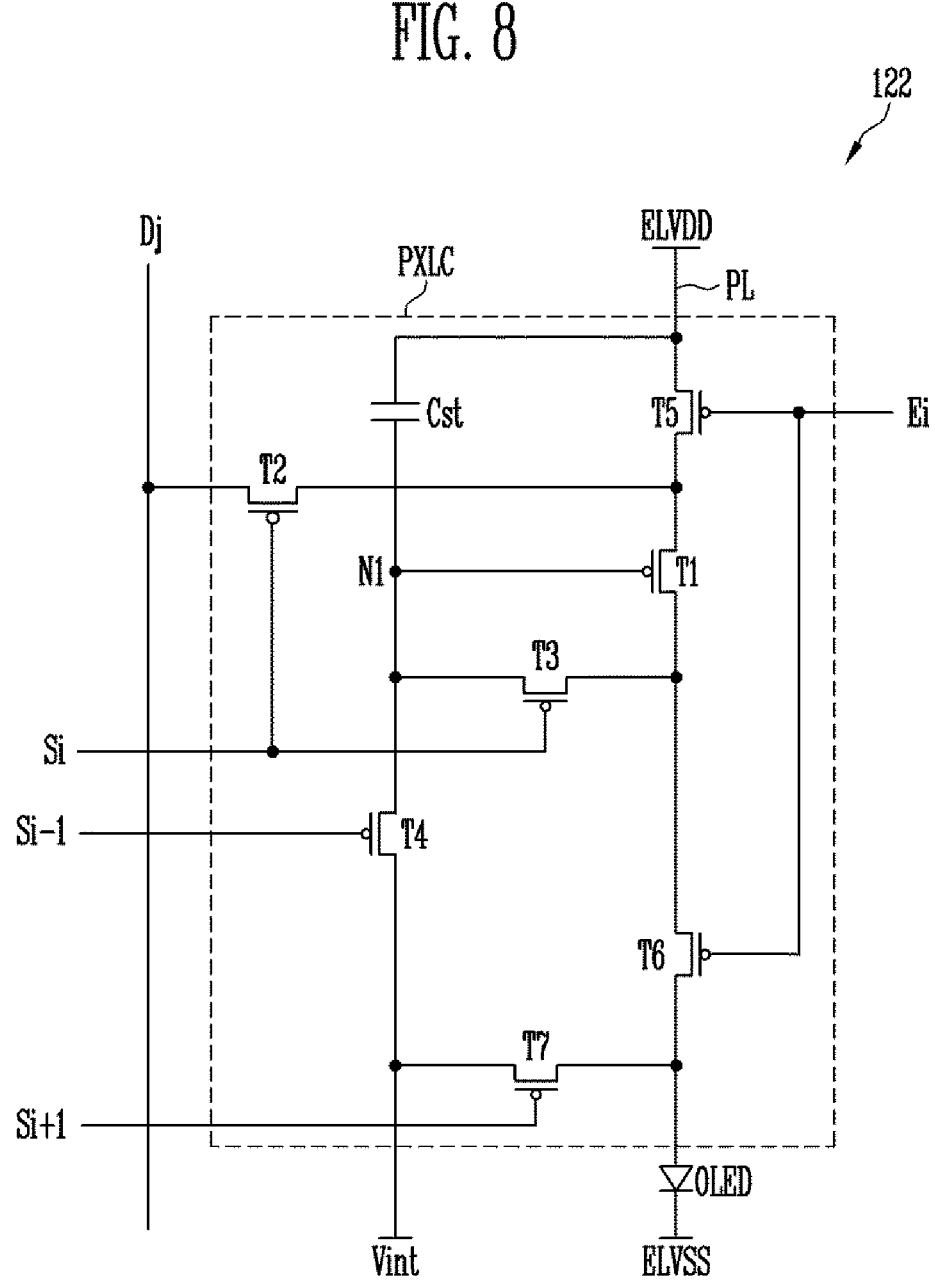
FIG. 8 is an exemplary circuit diagram of a pixel shown in FIG. 7.

FIG. 8 is an exemplary circuit diagram of the pixel shown in FIG. 7. For convenience, a pixel disposed on an ith (i is a natural number) row and a jth (j is a natural number) column in the display area DA is illustrated in FIG. 8. In FIG. 8, an ith scan line Si may be a current scan line for supplying a scan signal to pixels of the ith row. The other scan lines Si−1 and Si+1 connected to the pixel are used as initialization control lines for controlling initialization, and may be used as scan lines in pixels of adjacent rows, e.g., pixels of an (i−1)th row and an (i+1)th row. Hereinafter, for convenience, a scan line of the (i−1)th row is referred to as an "(i−1)th scan line Si−1," a current scan line of the ith row is referred to as an "ith scan line Si," a scan line of the (i+1)th row is referred to as an "(i+1)th scan line Si+1," an emission control line of the ith row is referred to as an "emission control line Ei," a data line of the jth column is referred to as a "data line Dj," and a power line, e.g., a first power line to which a first power source ELVDD is applied is referred to as a "power line PL."

Referring to FIG. 8, the pixel 122 according to the exemplary embodiment includes an organic light emitting device OLED and a pixel circuit PXLC connected to the organic light emitting diode OLED.

In exemplary embodiments, the light emitting device OLED may be an organic light emitting diode OLED, but the exemplary embodiments are not limited thereto. An anode electrode of the light emitting device OLED may be connected to a first transistor T1 via a sixth transistor T6, and a cathode electrode of the light emitting device OLED may be connected to a second power source ELVSS. The light emitting device OLED generates light with a predetermined luminance corresponding to an amount of pixel current supplied by the first transistor T1. The voltage of the first power source ELVDD may be set higher than that of the second power source ELVSS such that a current can flow through the light emitting device OLED.

According to the exemplary embodiments, the pixel circuit PXLC may include first, second, third, fourth, fifth, sixth, and seventh transistors T1, T2, T3, T4, T5, T6, and T7 and a storage capacitor Cst.

The seventh transistor T7 may be connected between an initialization power source Vint and the anode electrode of the light emitting device OLED. A gate electrode of the seventh transistor T7 may be connected to the (i+1)th scan line Si+1. The seventh transistor T7 may be turned on in response to receiving a scan signal from the (i+1)th scan line Si+1 and supply the voltage of the initialization power source Vint to the anode electrode of the light emitting device OLED. Here, the voltage of the initialization power source Vint may be set equal to or lower than that of a data signal. That is, the voltage of the initialization power source Vint may be set equal to or lower than the lowest voltage of the data signal. According to the current exemplary embodiment, An anode initialization control line is connected to the gate electrode of the seventh transistor T7 is the (i+1)th scan line Si+1, but the exemplary embodiments are not limited thereto. For example, according to another exemplary embodiment, the gate electrode of the seventh transistor T7 may be connected to the ith scan line Si. In this case, in response to receiving a scan signal from the ith scan line Si, the voltage of the initialization power source Vint may be supplied to the anode electrode of the light emitting device OLED via the seventh transistor T7.

The sixth transistor T6 may be connected between the first transistor T1 and the light emitting device OLED. A gate electrode of the sixth transistor T6 may be connected to the emission control line Ei. The sixth transistor T6 may be turned off in response to receiving an emission control signal (e.g., an emission control signal having a gate-off voltage (high-level voltage)) from the emission control line Ei, and be turned on otherwise.

The fifth transistor T5 may be connected between the power line PL and the first transistor T1. A gate electrode of the fifth transistor T5 may be connected to the emission control line Ei. The fifth transistor T5 may be turned off in response to receiving the emission control signal from the emission control line Ei, and be turned on otherwise.

A first electrode of the first transistor (or a driving transistor) T1 may be connected to the first power source ELVDD via the fifth transistor T5, and a second electrode of the first transistor T1 may be connected to the anode electrode of the organic light emitting diode OLED via the sixth transistor T6. A gate electrode of the first transistor T1 may be connected to a first node N1. The first transistor T1 may control a pixel current flowing from the first power source ELVDD to the second power source ELVSS via the light emitting device OLED, corresponding to a voltage of the first node N1.

The third transistor T3 may be connected between the second electrode of the first transistor T1 and the first node N1. A gate electrode of the third transistor T3 may be connected to the ith scan line Si. The third transistor T3 may be turned on in response to receiving the scan signal is supplied to the ith scan line Si, and electrically connect the second electrode of the first transistor T1 and the first node N1 to each other. Therefore, when the third transistor T3 is turned on, the first transistor T1 may be diode-connected.

The fourth transistor T4 may be connected between the first node N1 and the initialization power source Vint. A gate electrode of the fourth transistor T4 may be connected to the (i−1)th scan line Si−1. The fourth transistor T4 may be turned on in response to receiving the scan signal from the (i−1)th scan line Si−1, and supply the voltage of the initialization power source Vint to the first node N1. Meanwhile, according to the current exemplary embodiment, the (i−1)th scan line Si−1 is used as an initialization control line for initializing a gate node of the first transistor T1, i.e., the first node N1, but the exemplary embodiments are not limited thereto. For example, according to another exemplary embodiment, another control line such as an (i−2)th scan line Si−2 may be used as the initialization control line for initializing the gate node of the first transistor T1.

The second transistor T2 may be connected between the data line Dj and the first electrode of the first transistor T1. A gate electrode of the second transistor T2 may be connected to the ith scan line Si. The second transistor T2 may be turned on in response to receiving the scan signal from the ith scan line Si, and electrically connect the data line Dj and the first electrode of the first transistor T1 to each other.

The storage capacitor Cst may be connected between the first power line PL and the first node N1. The storage capacitor Cst may store a voltage corresponding to the data signal and a threshold voltage of the first transistor T1.

As described above, each of the pixels 122 according to the exemplary embodiment may include a pixel circuit PXLC including at least one pixel transistor (e.g., at least one of the first, second, third, fourth, fifth, sixth, and seventh transistors T1, T2, T3, T4, T5, T6, and T7) and the light emitting device OLED connected to the pixel circuit PXLC. However, the structure of the pixels 122 according to the exemplary embodiments are not limited to the exemplary embodiment shown in FIG. 8. That is, the pixels 122 may be implemented in various structures currently known in the art.

Figure 9:
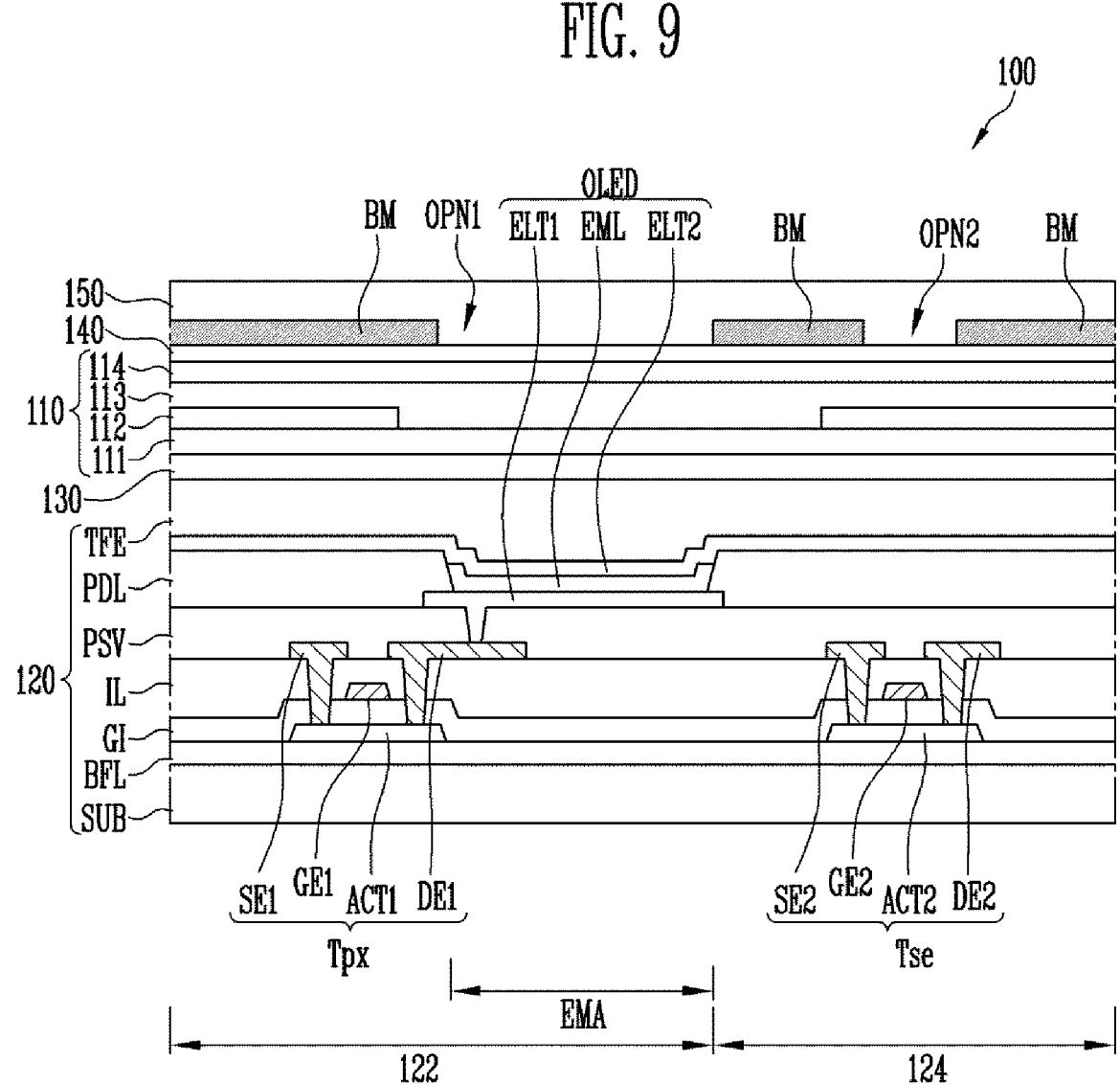
FIG. 9 is a section diagram of the display device according to an exemplary embodiment.

FIG. 9 is a section diagram of the display device according to an exemplary embodiment. In particular, FIG. 9 illustrates a section diagram of one area of the panel unit. For convenience, an embodiment in which the first touch sensor is attached onto one surface of the display panel is illustrated in FIG. 9, but the exemplary embodiments are not limited thereto. For example, according to another exemplary embodiment, the first touch sensor may be directly formed on a thin film encapsulation layer of the display panel.

Referring to FIG. 9, the first touch sensor 110 may be disposed on one surface of the display panel 120, to be coupled to the display panel 120 by an adhesive layer 130. Meanwhile, according to another exemplary embodiment, when the first touch sensor 110 is directly formed on a thin film encapsulation layer TFE of the display panel 120, the adhesive layer 130 and/or the sensor substrate 111 may be omitted. The sectional structure of the first touch sensor 110 has been described in FIG. 3, and therefore, its detailed description will be omitted.

The display panel 120 includes a light emitting device (e.g., an organic light emitting diode) OLED formed in the area of each pixel 122 and at least one pixel transistor Tpx connected to the light emitting device OLED. For example, the pixel transistor Tpx may be any one of the first, second, third, fourth, fifth, sixth, and seventh transistors T1, T2, T3, T4, T5, T6, and T7 shown in FIG. 8.

Also, the display panel 120 further includes a plurality of photo sensors 124 disposed between light emitting areas EMA of at least some pixels 122 among the pixels 122. For convenience, in FIG. 9, the sectional structure of the display panel 120 is illustrated based on one pixel 122 and one photo sensor 124 adjacent thereto.

According to the exemplary embodiments, the display panel 120 includes a display substrate SUB, a pixel transistor Tpx disposed on one surface of the display substrate SUB, a light emitting device OLED connected to the pixel transistor Tpx, and a thin film encapsulation layer TFE provided on the light emitting device OLED to cover the light emitting device OLED. According to the exemplary embodiments, the thin film encapsulation layer TFE may be formed to seal at least the display area DA. According to another exemplary embodiment, the thin film encapsulation layer TFE may be replaced with an upper substrate (or a color filter substrate) made of a glass or plastic material.

In exemplary embodiments, the display substrate SUB may be a rigid substrate or a flexible substrate, and the material of the display substrate SUB is not particularly limited. For example, the display substrate SUB may be a thin film substrate having flexibility.

A buffer layer BFL may be provided on one surface of the display substrate SUB. The buffer layer BFL may prevent an impurity from being diffused from the display substrate SUB, and improve the flatness of the display substrate SUB. According to the exemplary embodiments, the buffer layer BFL may be provided in a single layer, but be provided in a multi-layer including at least two layers. According to the exemplary embodiments, the buffer layer BFL may be an inorganic insulating layer made of an inorganic material. For example, the buffer layer BFL may include at least one of silicon nitride, silicon oxide, silicon oxynitride, or the like. When the buffer layer BFL is provided in the multi-layer, the layers may be formed of the same material or be formed of different materials. Meanwhile, according to another exemplary embodiment, the buffer layer BFL may be omitted.

The pixel transistor Tpx is provided on the buffer layer BFL. The pixel transistor Tpx includes an active layer ACT1, a gate electrode GE1, a source electrode SE1, and a drain electrode DE1.

According to the exemplary embodiments, the active layer ACT1 may be provided on the buffer layer BFL, and be formed of a semiconductor material. For example, the active layer ACT1 may be a semiconductor pattern made of poly-silicon, amorphous silicon, oxide semiconductor, or the like, and be formed of a semiconductor layer undoped or doped with an impurity. One region of the active layer ACT1 is undoped with the impurity, and the other region of the active layer ACT1 may be doped with the impurity.

According to the exemplary embodiments, a gate insulating layer GI may be provided over the active layer ACT1, and the gate electrode GE1 may be provided on the gate insulating layer GI. An interlayer insulating layer IL may be provided over the gate electrode GE1, and the source electrode SE1 and the drain electrode DE1 may be provided on the interlayer insulating layer IL. The source electrode SE1 and the drain electrode DE1 may be connected to different regions of the active layer ACT1 through contact holes passing through the gate insulating layer GI and the interlayer insulating layer IL, respectively.

According to the exemplary embodiments, a passivation layer PSV may be provided over the source electrode SE1 and the drain electrode DE1. The passivation layer PSV may cover the pixel transistor Tpx and planarize a top surface of the thin pixel transistor Tpx.

According to the exemplary embodiments, the light emitting device OLED may be provided on the passivation layer PSV. The light emitting device OLED may include a first electrode ELT1, a second electrode ELT2, and an emitting layer EML interposed between the first and second electrodes ELT1 and ELT2. According to the exemplary embodiments, the first electrode ELT1 and the second electrode ELT2 of the light emitting device OLED may be an anode electrode and a cathode electrode, respectively, but the exemplary embodiments are not limited thereto. According to another exemplary embodiment, the first electrode ELT1 and the second electrode ELT2 of the light emitting device OLED may be a cathode electrode and an anode electrode, respectively. The first electrode ELT1 of the light emitting device OLED is connected to one electrode, e.g., the drain electrode DE1 of the pixel transistor Tpx through a contact hole passing through the passivation layer PSV.

A pixel defining layer PDL that defines the area of each pixel 122 (or the light emitting area EMA of each pixel 122) is provided on one surface of the display substrate SUB on which the first electrode ELT1 of the light emitting device OLED, and the like are formed. In exemplary embodiments, the pixel defining layer PDL may expose an upper surface of the first electrode ELT1, and protrude from the display substrate SUB along the circumference of each light emitting area EMA.

The emitting layer EML is provided in the pixel region surrounded by the pixel defining layer PDL. The emitting layer EML may be disposed on the exposed surface of the first electrode ELT1. According to the exemplary embodiments, the emitting layer EML may have a multi-layered thin film structure including at least a light generation layer. For example, the emitting layer EML may include a hole injection layer, a hole transport layer, the light generation layer, a hole blocking layer, an electron transport layer, and an electron injection layer. According to the exemplary embodiments, the color of light generated from the emitting layer EML may be one of red, green, blue, and white, but the exemplary embodiments is not limited.

According to the exemplary embodiments, the second electrode ELT2 of the light emitting device OLED is provided on the emitting layer EML. In addition, the thin film encapsulation layer TFE covering the second electrode ELT2 of the light emitting device OLED is provided over the second electrode ELT2. When the display area DA of the display panel 120 is sealed using the thin film encapsulation layer TFE, the thickness of the display panel 120 is decreased, and flexibility can be ensured.

According to the exemplary embodiments, the thin film encapsulation layer TFE may be provided in a multi- or single-layered structure. For example, the thin film encapsulation layer TFE may include at least two inorganic layers and at least one organic layer interposed between the inorganic layers. According to another exemplary embodiment, the thin film encapsulation layer TFE may be implemented as a single layer including an organic/inorganic hybrid material.

According to an exemplary embodiment, a plurality of photo sensors 124 are arranged in the display panel 120. According to the exemplary embodiments, each of the photo sensors 124 may be implemented with a sensor transistor Tse formed together with the pixel transistor Tpx. That is, the sensor transistor Tse may be disposed on the same layer as the pixel transistor Tpx.

According to the exemplary embodiments, the sensor transistor Tse includes an active layer ACT2, a gate electrode GE2, a source electrode SE2, and a drain electrode DE2. The sensor transistor Tse may have a structure substantially similar or identical to that of the pixel transistor Tpx. Therefore, a detailed description of the structure of the sensor transistor Tse will be omitted. The sensor transistor Tse is connected to the driving circuit through each line. Accordingly, the driving circuit 200 can detect a current flowing through each sensor transistor Tse, and detect a touch input, using the detected current.

According to the exemplary embodiments, the structures of the pixel transistor Tpx and the sensor transistor Tse are not limited to the embodiment shown in FIG. 9. That is, the pixel transistor Tpx and the sensor transistor Tse may be implemented with transistors having various structures currently known in the art.

The first touch sensor 110 is disposed on the top of the display panel 120. At least one insulating layer (or adhesive layer) 140 is provided on the first touch sensor 110. A black matrix BM and a window 150 are disposed on the insulating layer 140.

According to the exemplary embodiments, the black matrix BM is disposed to cover the top of the non-display area at the periphery of the display area DA. In addition, the black matrix BM is disposed to cover the top of an area between the pixels 122 (particularly, an area between the light emitting areas EMA of the pixels 122) even in the display area DA. However, the black matrix BM exposes at least the light emitting area EMA of each pixel 122, and includes a first opening OPN1 corresponding to the light emitting area EMA. Also, the black matrix BM further includes a second opening OPN2 corresponding to the photo sensor 124. For example, the black matrix BM is entirely disposed on the top of the first touch sensor 110 and the display panel 120, and may be partially opened in the light emitting areas EMA of the respective pixels 122 and a plurality of areas corresponding to the respective photo sensors 124.

As the black matrix BM is opened at the top of each photo sensor 124, incident external light may be detected by the photo sensors 124. When there is no touch input, the photo sensors 124 can generate an uniform current, corresponding to the intensity of illumination of the incident external light. when a touch input occurs, the incident external light is blocked by the finger or the contact means at the area in which the touch input occurs, and therefore, the amount of light received to the photo sensor 124 disposed in the corresponding area is decreased. Accordingly, in the area in which the touch input occurs, a relatively weaker current flows through the photo sensor 124, or the current may not even flow through the photo sensor 124. Thus, if an amount of current output from each photo sensor 124 and/or a variation in the amount of current is detected, a touch input can be detected by the photo sensors 124.

Figure 10:
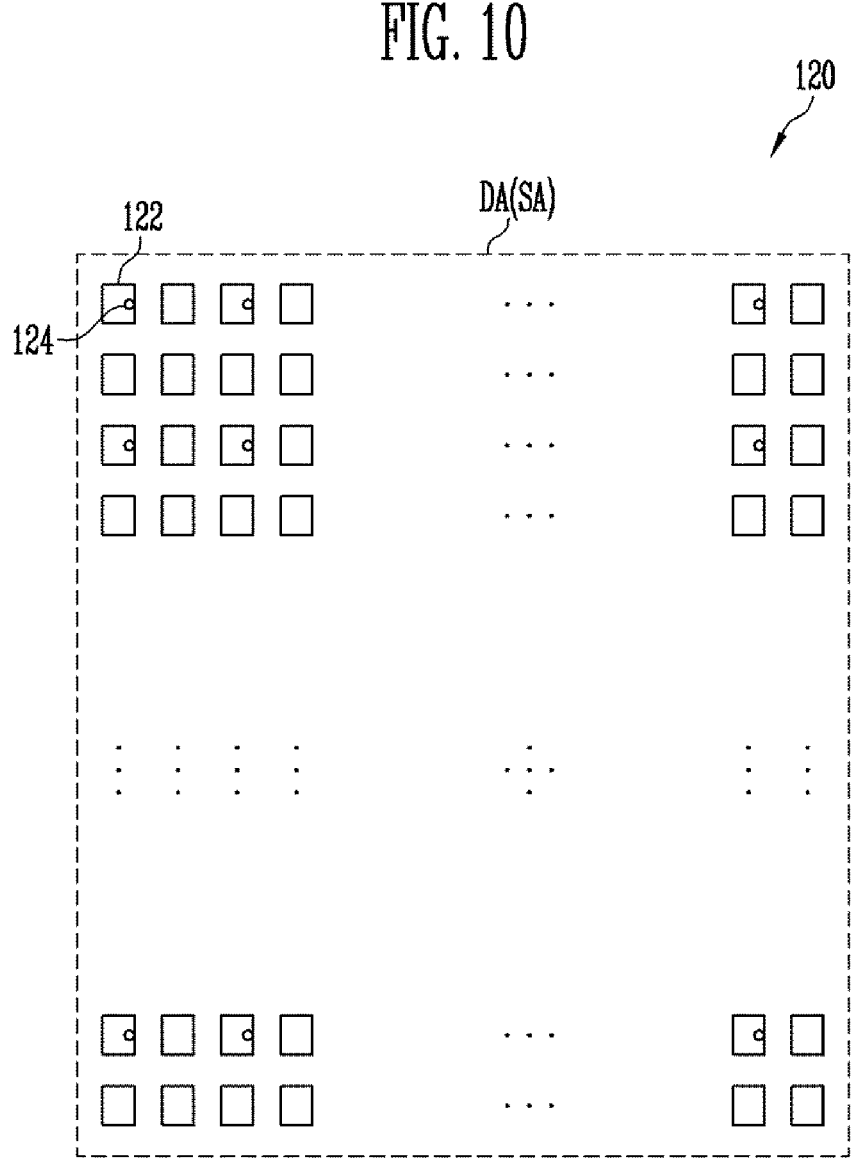
FIG. 10 is an example of the display panel shown in FIG. 2.

FIG. 10 is an example of the display panel shown in FIG. 2. In particular, FIG. 10 illustrates another embodiment related to the arrangement of the pixels and the photo sensors. In FIG. 10, components similar or identical to those of FIG. 7 are designated by like reference numerals, and their detailed descriptions will be omitted.

Referring to FIG. 10, according to the exemplary embodiments, the photo sensors 124 may be disposed in at least some of the pixels 122. For example, each of the photo sensors 124 may be implemented with at least one transistor included in any one pixel 122. As an example, when it is assumed that each of the pixels 122 is configured as shown in FIG. 8, each of the photo sensors 124 may be implemented with the third transistor T3 included in any one of the pixels 122. In this case, the black matrix BM may be partially opened on the top of the third transistor T3 with which the each of the photo sensors 124 is implemented. Also, each of the photo sensors 124 may be implemented with another transistor included in each of the pixels 122, in addition to the third transistor T3.

Figure 11:
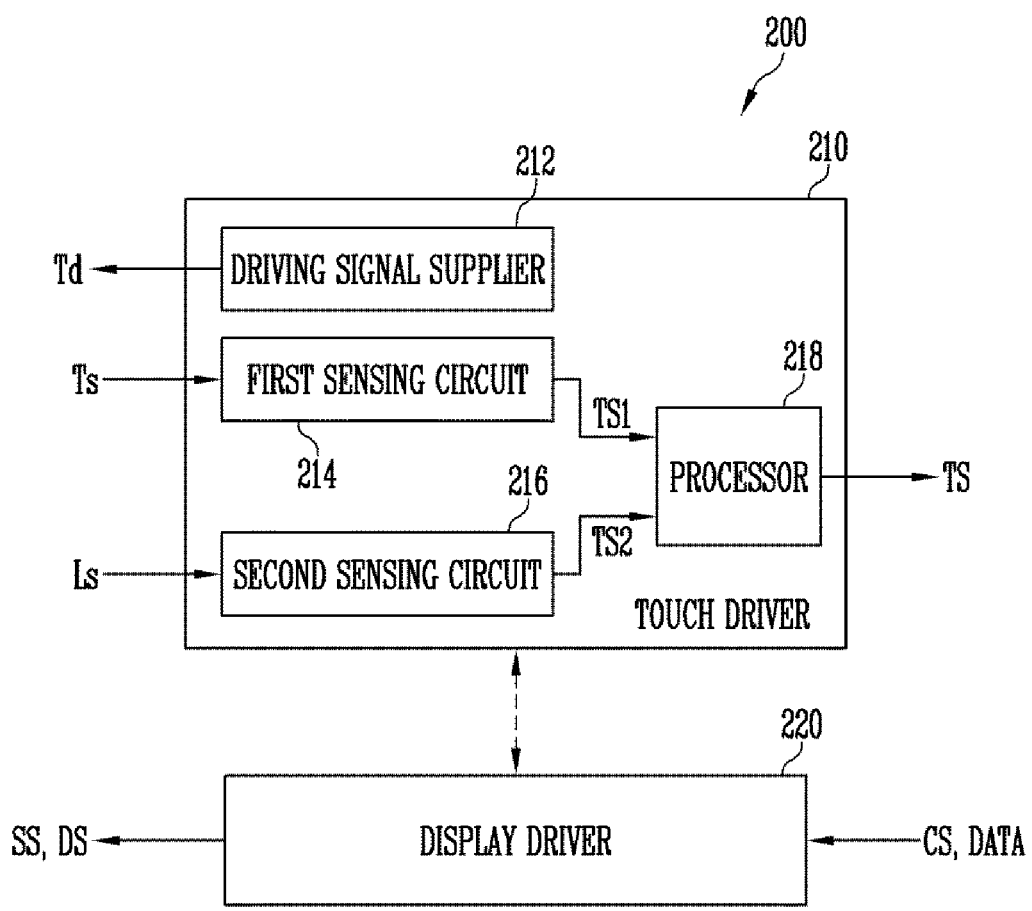
FIG. 11 is an exemplary block diagram of the driving circuit illustrated in FIG. 1.
Figure 12:
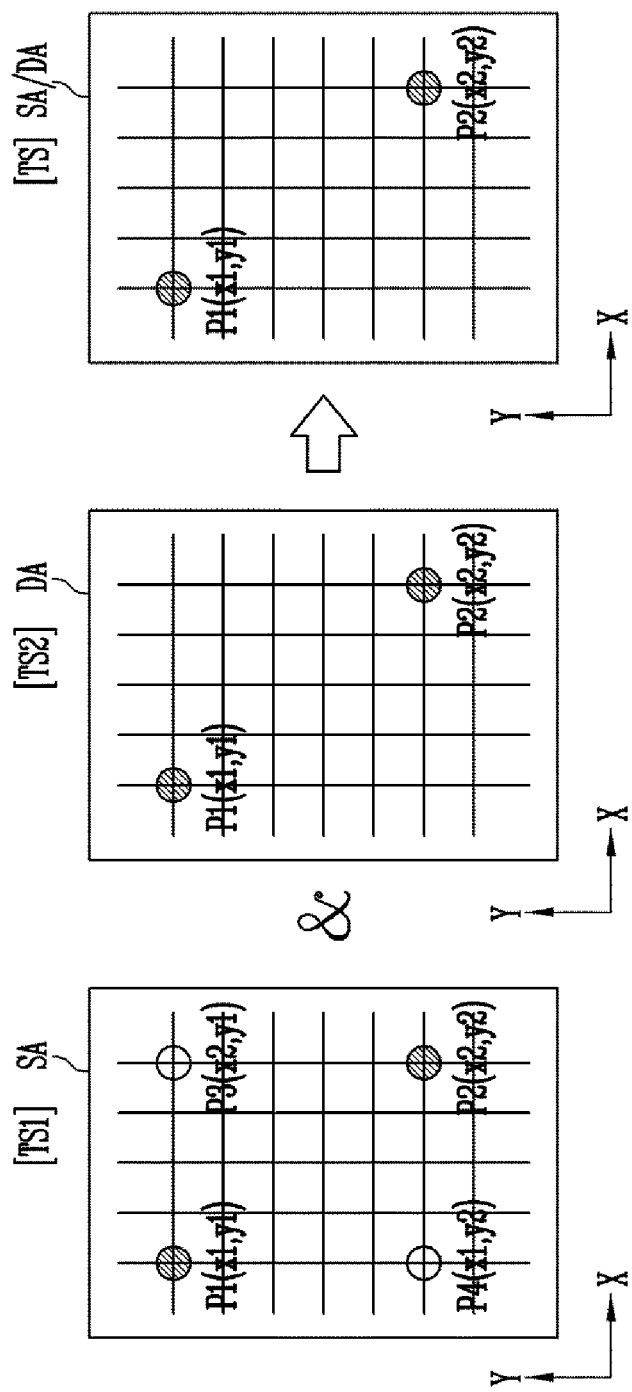
FIG. 12 illustrates an exemplary method for detecting a touch input, using a first touch detection value and a second touch detection value.
Figure 13:
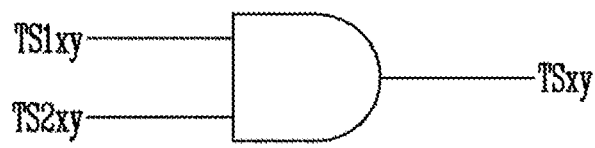
FIG. 13 is an example of a logical circuit that may be configured in a processor shown in FIG. 11.

FIG. 11 is an exemplary block diagram of the driving circuit illustrated in FIG. 1. FIG. 12 illustrates an exemplary method for detecting a touch input, using a first touch detection value and a second touch detection value. FIG. 13 is an example of a logical circuit that may be configured in a processor shown in FIG. 11.

Referring to FIG. 11, the driving circuit 200 drives the first touch sensor 110 and the display panel 120. The driving circuit 200 detects a touch input, using a first sensing signal Ts and a second sensing signal Ls, which are respectively input from the first touch sensor 110 and the second touch sensor (i.e., the photo sensors 124). For example, the driving circuit 200 may compare (or calculate) a first touch detection value TS1 detected by the first touch sensor 110 and a second touch detection value TS2 detected by the second touch sensor, and may detect a touch input, corresponding to the compared result. The driving circuit 200 may also compare position information of a touch input detected by the first touch sensor 110 and position information of a touch input detected by the second touch sensor, and may detect a touch input, corresponding to the compared result.

To this end, the driving circuit 200 includes a touch driver 210 and a display driver 220. According to the exemplary embodiments, the touch driver 210 and the display driver 220 may be driven independently from each other, or be driven in connection with each other.

The touch driver 210 supplies a driving signal Td to the first touch sensor 110, and generates a first touch detection value TS1, corresponding to the first sensing signal Ts input from the first touch sensor 110. Also, the touch driver 210 generates a second touch detection value TS2, corresponding to the second sensing signal Ls input from each of the photo sensors 124 of the second touch sensor during a touch sensing period in which the first touch sensor 110 is driven. The touch driver 210 may detect a touch input, using the first touch detection value TS1 and the second touch detection value TS2, and generates a touch detection signal TS corresponding to the detected touch input. The touch detection signal TS may be input to the host and/or the display driver 220. Then, the host and/or the display driver 220 may perform an operation corresponding to the touch input.

To this end, the touch driver 210 may include a driving signal supplier 212, a first sensing circuit 214, a second sensing circuit 216, and a processor 218.

The driving signal supplier 212 supplies the touch driving signal Td to each of the first sensing electrodes 112 and the second sensing electrodes 114 during the touch sensing period in which a touch sensing mode is activated.

The first sensing circuit 214 receives a first sensing signal Ts transmitted from each of the first sensing electrodes 112 and the second sensing electrodes 114 during the touch sensing period, and generates a first touch detection value TS1, corresponding to the first sensing signal Ts. The first sensing signal Ts may be a signal of an analog form, which corresponds to the driving signal Td. According to the exemplary embodiments, the first sensing circuit 214 may generate a first touch detection value in the form of a digital code, corresponding to the first sensing signal Ts. For example, the first sensing circuit 214 may compare the first sensing signal Ts transmitted from each of the first sensing electrodes 112 and the second sensing electrodes 114 with a predetermined reference value, and generate a first touch detection value TS1 in the form of a digital code, corresponding to the compared result.

For example, when the first sensing signal Ts transmitted from each of the first sensing electrodes 112 and the second sensing electrodes 114 is a predetermined reference value or less or when a variation in the quantity of charges detected from the first sensing signal Ts is a predetermined reference value or more, the first sensing circuit 214 may determine that a touch input has occurred on a corresponding sensing electrodes 112 and 114. Otherwise, the first sensing circuit 214 may determine that any touch input has not occurred on the corresponding sensing electrodes 112 and 114. The first sensing circuit 214 may detect a touch input by detecting a coordinate point at which at least one first sensing electrode 112 and at least one second sensing electrode 114, on which it is determined that the touch input has occurred, intersect each other, and transmit a digital code of "1" with respect to the corresponding coordinate point. The first sensing circuit 214 may transmit a digital code of "0" with respect to the other coordinate points.

The second sensing circuit 216 receives a second sensing signal Ls from each of the photo sensors 124 during the touch sensing period in which the first touch sensor 110 is driven, and generates a second touch detection value TS2, based on the second sensing signal Ls.

The second sensing signal Ls may be a current flowing through each of the photo sensors 124 or a signal including information on an amount of current flowing through each of the photo sensors 124 or a variation in the amount of current. That is, the second sensing circuit 216 detects an amount of current flowing through each of the photo sensors 124 during the touch sensing period, and generates a second touch detection value, using the detected amount of current.

For example, the second sensing circuit 216 may compare the amount of current flowing through each of the photo sensors 124 with a predetermined reference amount of current, and generate a second touch detection value TS2 in the form of a digital code, corresponding to the compared result. As an example, the second sensing circuit 216 may generate a second touch detection value by detecting an amount of current flowing through each of the photo sensors 124 and detecting the position of a photo sensor 124 from which a current of which amount is the predetermined reference amount of current or less may be transmitted. For example, the second sensing circuit 216 may determine that a touch input has occurred with respect to a coordinate point corresponding to the photo sensor 124 from which a current of which amount is the reference amount of current or less is transmitted, and transmit the digital code of "1." The second sensing circuit 216 may transmit the digital code of "0" with respect to the other coordinate points.

The second sensing circuit 216 may also detect a variation in the amount of current flowing through each of the photo sensors 124, and determine that a touch input has occurred with respect to a coordinate point corresponding to the photo sensor 124 of which variation is the predetermined reference amount of current or more. The second sensing circuit 216 may transmit the digital code of "1" with respect to a coordinate point at which it is determined that the touch input has occurred, and transmit the digital code of "0" with respect to the other coordinate points.

The processor 218 may detect a touch input by comparing the first touch detection value TS1 detected by the first sensing circuit 214 and the second touch detection value TS2 detected by the second sensing circuit 216. For example, the processor 218 may determine that a touch input has occurred at only a point at which the touch point detected by the first touch detection value TS1 and the touch point detected by the second touch detection value TS2 overlap with or correspond to each other, and may generate a touch detection signal TS, corresponding to the determined result.

For example, as shown in FIG. 12, it is assumed that four touch points P1(x1, y1), P2(x2, y2), P3(x2, y1), and P4(x1, y2) on the sensing area SA are detected by the first touch detection value TS1, and two touch points P1(x1, y1) and P2(x2, y2) on the display area DA are detected by the second touch detection value TS2. In this case, the processor 218 may determine that a touch input has occurred only at P1(x1, y1) and P2(x2, y2), and may transmit a touch detection signal TS, corresponding to the determined result.

The sensing area SA and the display area DA may refer to active areas of the first touch sensor 110 and the display panel 120, respectively, and may be areas that overlap with or correspond to each other when viewed on a plane. Also, when the resolution (density) of the second touch sensor, i.e., the photo sensors 124 is lower than that of the first touch sensor 110, a plurality of coordinate points may be allocated corresponding to the respective photo sensors 124, and the same digital code may be provided to the plurality of coordinate points, corresponding to the amount of current output from a corresponding photo sensor 124. According to the exemplary embodiment, a coordinate plane defined by the first touch sensor 110 can correspond to that defined by the second touch sensor.

According to the exemplary embodiments, the processor 218 may detect a touch input by performing an AND operation of the first touch detection value TS1 and the second touch detection value TS2. For example, the processor 218 may include an AND gate as shown in FIG. 13. According to the exemplary embodiments, the AND gate may transmit a touch detection signal TSxy with respect to each coordinate point by performing an AND operation on a first touch detection value TS1$xy$ and a second touch detection value TS2$xy$ with respect to the corresponding coordinate point.

The display driver 220 generates a scan signal SS and a data signal DS, corresponding to image data DATA and various control signals CS, which are supplied from the host, etc., and supplies the scan signal SS and the data signal DS to the pixels 122 of the display panel 120. Accordingly, an image corresponding to the image data DATA is displayed in the display area DA.

According to the exemplary embodiments, the display driver 220 may include a scan driver for generating the scan signal SS, a data driver for generating the data signal DS, and a timing controller for controlling the scan driver and the data driver. After the display driver 220 is manufactured separately from the display panel 120, the display driver 220 may be connected to the display panel 120. At least a portion of the display driver 220 may also be integrally manufactured with the display panel 120.

In the display device 10 including the driving circuit 200 and the hybrid type touch sensor including the first touch sensor 110 and the second touch sensor, a touch input may be detected by synthetically reflecting the first touch detection value TS1 and the second touch detection value TS2. For example, the driving method of the display device 10 for detecting a touch input may include a step of acquiring a first touch detection value TS1, corresponding to a first sensing signal Ts transmitted from the first touch sensor 110 while driving the first touch sensor 110, a step of acquiring a second touch detection value TS2, corresponding to a second sensing signal Ls transmitted from the second touch sensor (i.e., the photo sensors 124) during a period in which the first touch sensor 110 is driven, and a step of a touch input by comparing the first touch detection value TS1 and the second touch detection value TS2. In exemplary embodiments, the step of detecting the touch input may include a step of generating a touch detection signal TS by performing an AND operation of the first touch detection value TS1 and the second touch detection value TS2.

According to the above-described exemplary embodiment, the display device 10 may detect a touch input, using the first touch detection value TS1 and the second touch detection value TS2. That is, in exemplary embodiments, the display device 10 may determine that a touch input has occurred with respect to only a coordinate point corresponding to at least one coordinate point at which it is determined by the second touch sensor that the touch input has occurred among at least one coordinate point at which it is determined by the first touch sensor 110 that the touch input has occurred. Thus, a ghost phenomenon occurring in the first touch sensor 110 due to a multi-touch may be removed or reduced through a combination of the first touch sensor 110 with the second touch sensor. Also, a ghost phenomenon occurring in the second touch sensor due to the shadow of contact means such as a finger may be removed or reduced through a combination of the second touch sensor with the first touch sensor 110.

According to the above-described embodiment, the self-capacitance type first touch sensor 110 may prevent or reduced misrecognition (e.g., a ghost phenomenon) caused by a multi-touch while providing high-sensitivity characteristics. Thus, it is possible to provide the display device 10 including a touch sensor (i.e., a touch sensor including the first touch sensor 110 and the second touch sensor) that can recognize a multi-touch while exhibiting high-sensitivity characteristics.

Figure 14:
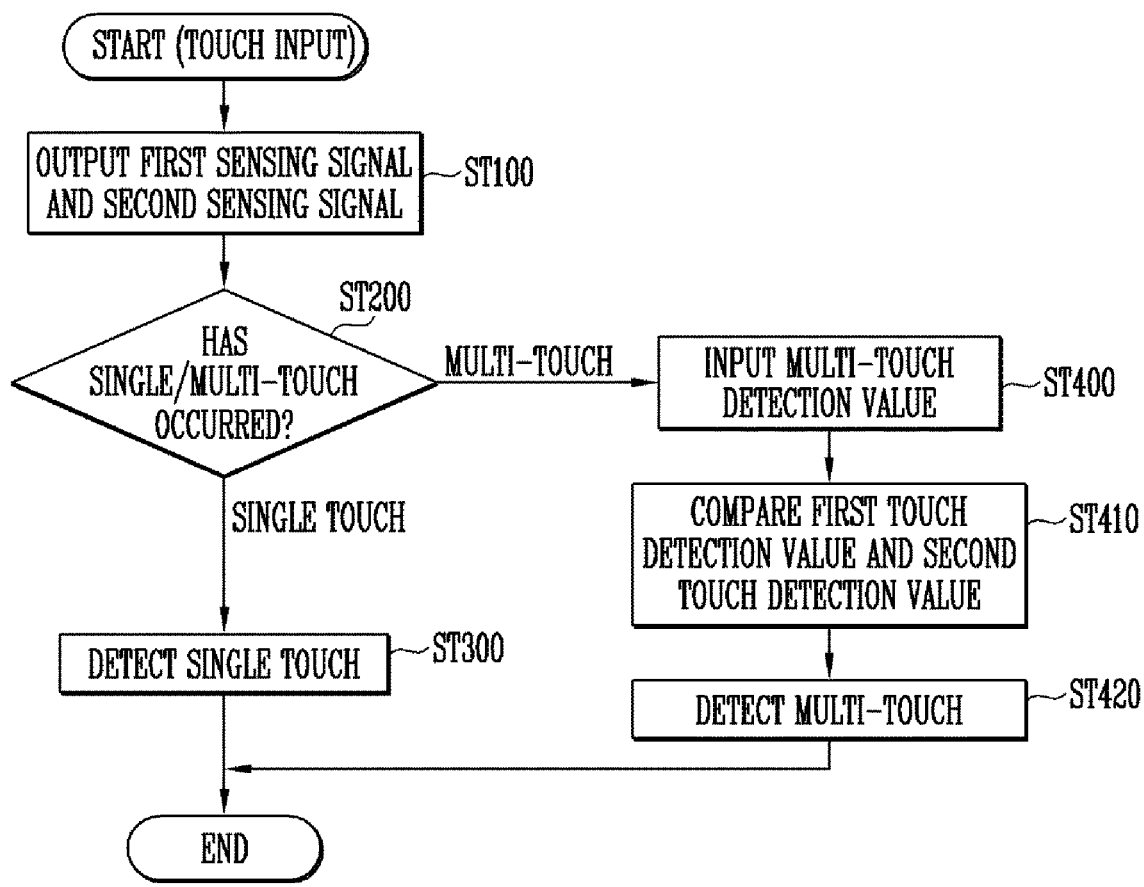
FIG. 14 illustrates an exemplary method of a touch detection of the display device according to an exemplary embodiment.

FIG. 14 illustrates an exemplary method of a touch detection of the display device according to an exemplary embodiment.

Referring to FIG. 14, first, when a touch input occurs in the display device 10, a first sensing signal TS and a second sensing signal Ls, which correspond to the touch input, are transmitted from the first touch sensor 110 and the second touch sensor (i.e., the photo sensors 124), respectively. The first sensing signal TS and the second sensing signal Ls are input to the driving circuit 200 (ST100).

The driving circuit 200 determines whether a single or multi-touch has occurred based on at least one of the first sensing signal Ts and the second sensing signal Ls. For example, the driving circuit 200 may determine whether the single or multi-touch has occurred by comparing first sensing signals Ts respectively corresponding to coordinate points. The driving circuit 200 may also determine whether the single or multi-touch has occurred by comparing the first sensing signal Ts and the second sensing signal Ls (ST200).

In response to determining that the single touch has occurred, the driving circuit 200 detects the single touch, based on the first sensing signal Ts generated by the first touch sensor 110. For example, when it is determined that the single touch has occurred, the driving circuit 200 may transmit a first touch detection value TS1 received from the first sensing circuit 214, corresponding to the first sensing signal Ts (ST300).

In response to determining that the multi-touch has occurred, a multi-touch detection value is input to the processor 218. For example, a first touch detection value TS1 generated by the first touch sensor 110 and the first sensing circuit 214 and a second touch detection value TS2 generated by the second touch sensor and the second sensing circuit 216 may be transmitted to the processor 218 (ST400).

Then, the processor 218 detects a touch input, using the first touch detection value TS1 and the second touch detection value TS2. For example, when the touch input is a multi-touch, the processor 218 may compare or calculate the first touch detection value TS1 and the second touch detection value TS2, and detect the multi-touch, based on the compared or calculated result (ST410 and ST420).

In exemplary embodiments, the panel unit 100, the driving circuit 200 including the touch driver 210 including the driving signal supplier 212, the first sensing circuit 214, the second sensing circuit 216, and the processor 218, and the display driver 220, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the panel unit 100, the driving circuit 200 including the touch driver 210 including the driving signal supplier 212, the first sensing circuit 214, the second sensing circuit 216, and the processor 218, and the display driver 220, and/or one or more components thereof may include or otherwise be associated with one or more memories (not shown) including code (e.g., instructions) configured to cause, the panel unit 100, the driving circuit 200 including the touch driver 210 including the driving signal supplier 212, the first sensing circuit 214, the second sensing circuit 216, and the processor 218, and the display driver 220, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

According to the exemplary embodiments, it is possible to provide a display device including first and second touch sensors of different types and a driving method thereof. In particular, in the display device and the driving method thereof according to the exemplary embodiments, a touch input is detected by comparing a first touch detection value detected by the first touch sensor and a second touch detection value detected by the second touch sensor. Accordingly, misrecognition caused by a multi-touch can be prevented or reduced, and the sensitivity of the touch sensor can be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a first touch sensor comprising first sensing electrodes and second sensing electrodes, arranged in a sensing area intersecting each other;
    a display panel comprising:
        pixels arranged in a display area overlapping with the sensing area; and
        a second touch sensor comprising photo sensors disposed between the pixels or in the pixels; and
    a driving circuit configured to drive the first touch sensor and the display panel, the driving circuit including a first sensing circuit and a second sensing circuit,
    wherein the first sensing circuit of the driving circuit is configured to simultaneously detect a plurality of touches on the first touch sensor,
    wherein the second sensing circuit of the driving circuit is configured to simultaneously detect a plurality of touches on the second touch sensor,
    wherein the driving circuit is configured to detect a plurality of touch inputs by performing an AND operation of a first touch detection value detected by the first touch sensor and a second touch detection value detected by the second touch sensor, and
    wherein the driving circuit comprises:
        a driving signal supplier configured to supply a driving signal to each of the first sensing electrodes and the second sensing electrodes during a touch sensing period;
        the first sensing circuit configured to receive a sensing signal corresponding to the driving signal from each of the first sensing electrodes and the second sensing electrodes during the touch sensing period, and generate the first touch detection value, corresponding to the sensing signal;
        the second sensing circuit configured to detect an amount of current flowing through each of the photo sensors during the touch sensing period, and generate the second touch detection value, corresponding to the amount of current; and
        a processor configured to detect the plurality of touch inputs by comparing the first touch detection value and the second touch detection value.

2. The display device of claim 1, wherein the photo sensors are disposed between light emitting areas of the pixels.

3. The display device of claim 2, wherein each of the pixels comprises a pixel circuit comprising at least one transistor and a light emitting device connected to the pixel circuit,
    wherein each of the photo sensors comprises a sensor transistor disposed on the same layer as the at least one transistor.

4. The display device of claim 1, wherein each of the pixels comprises a pixel circuit comprising at least one transistor and a light emitting device connected to the pixel circuit, and
    wherein each of the photo sensors is implemented with the at least one transistor comprised in any one pixel among the pixels.

5. The display device of claim 1, further comprising a black matrix disposed on at least an area between the pixels, the black matrix comprising an opening corresponding to each of the photo sensors.

6. The display device of claim 1, wherein the first touch sensor is a self-capacitance type touch sensor.

7. The display device of claim 1, wherein the first sensing circuit is configured to:
    compare the sensing signal output from each of the first sensing electrodes and the second sensing electrodes with a predetermined reference value; and
    generate the first touch detection value in a form of a digital code, corresponding to the compared result.

8. The display device of claim 1, wherein the second sensing circuit is configured to:
    compare an amount of current output from each of the photo sensors or a variation in an amount of current with a predetermined reference amount of current; and
    generate the second touch detection value in a form of a digital code, corresponding to the compared result.

9. The display device of claim 8, wherein the second sensing circuit is configured to generate the second touch detection value by detecting a position of a photo sensor from which a current of which amount is the reference amount of current or less is output among the photo sensors.

10. The display device of claim 1, wherein the plurality of touches on the first touch sensor include a first touch at a first coordinate location and a second touch at a second coordinate location, and the plurality of touches on the second touch sensor include the first touch at the first coordinate location and the second touch at the second coordinate location.

11. The display device of claim 1, wherein the first touch detection value represents a first number of touches on the first touch sensor and the second touch detection value represents a second number of touches on the second touch sensor, and the first number is higher than the second number.

12. A method for driving a display device comprising a first touch sensor comprising first and second sensing electrodes arranged in a sensing area to intersect each other and a second touch sensor comprising photo sensors arranged together with pixels in a display area overlapping with the sensing area, the method comprising:
    acquiring a first touch detection value corresponding to a plurality of touches simultaneously occurring on the first touch sensor in response to a first sensing signal received from the first touch sensor while driving the first touch sensor;
    acquiring a second touch detection value corresponding to a plurality of touches simultaneously occurring on the second touch sensor in response to a second sensing signal received from the second touch sensor during a period in which the first touch sensor is driven; and
    detecting a plurality of touch inputs on the display device by comparing the first touch detection value and the second touch detection value,
    wherein the detecting of the plurality of touch inputs includes generating a touch detection signal by performing an AND operation of the first touch detection value and the second touch detection value,
wherein the acquiring of the first touch detection value comprises:
supplying a driving signal to each of the first and second sensing electrodes;
receiving the first sensing signal from each of the first and second sensing electrodes; and
generating the first touch detection value, corresponding to the received first sensing signal.

13. The method of claim 12, wherein the generating of the first touch detection value comprises:
comparing the first sensing signal with a predetermined reference value; and
outputting the first touch detection value in a form of a digital code, in response to the compared result.

14. The method of claim 12, further comprising determining whether a multi-touch has occurred, based on at least one of the first sensing signal and the second sensing signal,
wherein the plurality of touch inputs are detected using the first touch detection value and the second touch detection value in response to determining that the multi-touch occurred.

15. The method of claim 12, wherein the plurality of touches on the first touch sensor include a first touch at a first coordinate location and a second touch at a second coordinate location, and the plurality of touches on the second touch sensor include the first touch at the first coordinate location and the second touch at the second coordinate location.

16. The method of claim 12, wherein the first touch detection value represents a first number of touches on the first touch sensor and the second touch detection value represents a second number of touches on the second touch sensor, and the first number is higher than the second number.

17. A method for driving a display device comprising a first touch sensor comprising first and second sensing electrodes arranged in a sensing area to intersect each other and a second touch sensor comprising photo sensors arranged together with pixels in a display area overlapping with the sensing area, the method comprising:
acquiring a first touch detection value corresponding to a plurality of touches simultaneously occurring on the first touch sensor in response to a first sensing signal received from the first touch sensor while driving the first touch sensor;
acquiring a second touch detection value corresponding to a plurality of touches simultaneously occurring on the second touch sensor in response to a second sensing signal received from the second touch sensor during a period in which the first touch sensor is driven; and
detecting a plurality of touch inputs on the display device by comparing the first touch detection value and the second touch detection value,
wherein the detecting of the plurality of touch inputs includes generating a touch detection signal by performing an AND operation of the first touch detection value and the second touch detection value,
wherein the acquiring of the second touch detection value comprises:
detecting an amount of current flowing through each of the photo sensors or a variation in the amount of current;
comparing the amount of current flowing through each of the photo sensors or the variation in the amount of current with a predetermined reference amount of current; and
generating the second touch detection value, corresponding to the compared result.

18. The method of claim 17, wherein the generating of the second touch detection value comprises:
comparing the amount of current flowing through each of the photo sensors or the variation in the amount of current with the predetermined reference amount of current; and
outputting the second touch detection value in a form of a digital code, in response to the compared result.

* * * * *